United States Patent
Stupakis

(10) Patent No.: US 6,948,681 B2
(45) Date of Patent: Sep. 27, 2005

(54) AUTOMATED CARGO TRANSPORTATION SYSTEM

(75) Inventor: John S. Stupakis, Hewitt, NJ (US)

(73) Assignee: BoXaiR Engineering LLC, Hewitt, NJ (US)

(*) Notice: Subject to any disclaimer, the term of this patent is extended or adjusted under 35 U.S.C. 154(b) by 0 days.

(21) Appl. No.: 10/341,206

(22) Filed: Jan. 13, 2003

(65) Prior Publication Data
US 2004/0135031 A1 Jul. 15, 2004

(51) Int. Cl.⁷ .................................................. B64C 1/00
(52) U.S. Cl. ...................... 244/13; 244/175; 244/117 R; 244/903; 701/3; 701/11
(58) Field of Search ................................. 244/13, 75 R, 244/76 R, 175, 117 R, 118.1, 118.2, 119, 903; 701/3, 11

(56) References Cited

U.S. PATENT DOCUMENTS

| | | | |
|---|---|---|---|
| 6,056,237 A | * | 5/2000 | Woodland .................. 244/3.15 |
| 6,377,875 B1 | * | 4/2002 | Schwaerzler ................... 701/2 |
| 6,615,165 B2 | * | 9/2003 | Carroll .......................... 703/3 |
| 6,626,397 B2 | * | 9/2003 | Yifrach ..................... 244/35 R |
| 6,840,480 B2 | * | 1/2005 | Carroll ...................... 244/120 |
| 2002/0074454 A1 | * | 6/2002 | Henderson .............. 244/135 A |

* cited by examiner

Primary Examiner—J. Woodrow Eldred
(74) Attorney, Agent, or Firm—Hoffmann & Baron, LLP

(57) ABSTRACT

A modular automated air transport system comprising an unmanned autonomous aircraft having a selectively detachable control systems portion and a structural air frame portion, wherein the structural air frame portion contains an interior cargo hold, aerodynamic members having control surfaces and at least one propulsion device attached to the structural air frame portion; and wherein the control system portion includes a control computer for autonomously controlling the flight of said air transport system from one known location to a second known location.

6 Claims, 3 Drawing Sheets

AUTOMATED CARGO TRANSPORTATION SYSTEM

FIELD OF THE INVENTION

The present invention relates to unmanned aerial vehicles (UAVs). In particular to a modular design aircraft for the efficient high speed transportation of cargo and freight, and the completion of missions where unacceptably high risks make the use of human piloted vehicles unfeasible.

BACKGROUND OF THE INVENTION

There has been a recent increased emphasis on the use of unmanned aerial vehicles for performing, various activities in both civilian and military situations where the use of manned flight vehicles is not appropriate or efficient. One particular potential application is air cargo and freight transportation.

The process of shipping goods throughout the world is complicated by various factors such as geographic remoteness, lack of ground transportation infrastructure, political instability and environmental factors such as temperature. In some cases while it is possible to ship goods to remote or hard to reach locations, the risk to human life is too great to utilize conventional air cargo.

Transportation of cargo within remote undeveloped areas, for example, sections of Africa, Asia and South America is presently difficult because of the geographic remoteness and lack of ground transportation infrastructure. Therefore, goods shipped by land face a long and arduous journey, while conventional air cargo can be prohibitively expensive.

Another problem with the shipment of cargo arises from the lack of infrastructure to handle the volume of freight to be moved in a time efficient manner. For example, most trade in Europe in accomplished by utilizing ground freight containers. There are currently a large number of container ports being utilized, however due to the ever-increasing volume; the movement in and out of these container ports is severely restricted. In addition, because of the formalities required at border crossings, traffic flow is constrained, thus increasing transportation time and cost.

A further problem encountered using convention air freight methods has been reaching locations that have severe weather conditions such as in the Artic and Antarctic. These locations are typically accessed using air transport during temperate seasons due to the risks to pilots and other aircraft personnel presented during seasons severe weather. Such seasonal supply limitations presented by weather conditions can present difficulties for personnel stationed in these regions, especially in emergency situations such as medical emergencies.

A further problem associated with conventional air vehicles is the risk encountered by pilots engaging activities such as fire fighting. Conditions such as pilot fatigue, darkness, and environmental factors caused by the fire all present increased risk factors to pilot performing this type of activity.

In addition to the factors concerning the difficulties in moving freight and cargo due to geographic and environmental factors, the use of conventional air freight also presents several logistical problems. Such logistical problem prevalent in conventional air freight operations are the time needed to load and unload a plane, and the expense of the aircraft. Loading and unloading aircraft in the conventional manner generally requires the movement of the cargo in small discreet loads, such as palletized loads. The use of palletized loads is an inefficient use of an air transport vehicle because time spent on the ground increases turnaround time, (the time required to unload an aircraft, perform service, and load the next freight shipment), which slows the process for moving freight.

Additionally, the high cost of an air cargo vehicle, especially with respect to the size of the load that can be transported, is a problem. For example, the cost of ground transportation per unit of mass transported is far less than the cost of air transportation per unit of mass transported. A portion of the excess cost is due to the greater cost of the air transport vehicle in relation to the ground transport vehicle and the cost of operation, another factor is the high cost of air crews (pilots, copilots which materially add to the operational cost of the vehicle. A factor in increasing both of these costs is increased cost of aircraft avionics in relation to ground based vehicle control systems and aircraft cabin environmental controls.

Prior air cargo systems did not satisfactorily address these problems. The prior air cargo vehicles were not designed to satisfy these particular uses. The present air cargo vehicles tended to be inefficient to load and unload due to the difficulty access to the cargo hold and the manner in which cargo had to be loaded into the vehicle. Environmental factors also limited the usefulness of prior art systems. The prior air cargo vehicles were relatively expensive as well.

None of the prior air cargo vehicles satisfactorily provided the efficiency of transporting cargo and freight that is desired. It is therefore desirable to provide such a vehicle that will allow cargo and freight, to be easily and securely transported to remote areas, lacking in infrastructure to adequately provide for ground transportation needs using a low cost and efficient vehicle. In addition, there is a need for an air cargo and transport system to provide airborne service in applications of high risk in order to accomplish essential tasks.

SUMMARY OF THE INVENTION

The present invention accomplishes those needs by providing a unmanned aerial vehicle (UAV) of modular design for efficiently and inexpensively transporting cargo and freight to remote or hard to reach area and to perform tasks that would otherwise be too risky for a manned aircraft to undertake. The UAV of the present invention provides a modular design aircraft that can be remotely piloted or autonomously controlled by way of an on-board computer system. The design of the present invention provides a modular gondola and an air vehicle. The modular gondola includes an interchangeable electronics bay, avionics, telemetry, Forward Looking Infrared Radiometer (FLIR), Side-looking Aperture Radar (SAR) and other systems required to remotely locate and pilot the aircraft. The air vehicle includes the structural and aerodynamic and aircraft elements as well as engines. The structural elements of the aircraft include the fuselage cargo bay and support structures for aerodynamic elements and engines. The aerodynamic elements include the wings and all control surface required to generate sufficient lift and control flight. The modular gondola and air vehicle utilizes quick release connectors to attach all control systems to the air vehicle. The gondola and aircraft structure can be attached and separated in the same manner as a typically road going tractor truck and trailer unit. The present invention further provides the capability to remotely control the aircraft without the need for an onboard pilot. Therefore the gondola portion of the aircraft need not include any facilities for accommodating a human pilot such as seating, environmental controls, or safety features to protect the pilots. Additionally, the aircraft of the present invention can be flown in conditions what would in prior systems pose an unacceptable risk to the human pilots onboard. Furthermore, the present invention incorporates an air vehicle for receiving a freight container, such as, for example a container typically used in the ground transportation industry. The air vehicle will be adapted to be of sufficient size for such a container to be easily loaded and unloaded. The loading and unloading can thus be accomplished quickly and with a minimum of manual labor.

The present invention therefore provides a modular automated air transport system comprising an unmanned autonomous aircraft having a selectively detachable control systems portion and a structural air frame portion, wherein the structural air frame portion contains an interior cargo hold, aerodynamic members having control surfaces and at least one propulsion device attached to the structural air frame portion; and wherein the control system portion includes a control computer for autonomously controlling the flight of said air transport system from one known location to a second known location.

These and other features of the present invention are evident from the drawings along with the detailed description of preferred embodiments.

DETAILED DESCRIPTION

Figure 1:
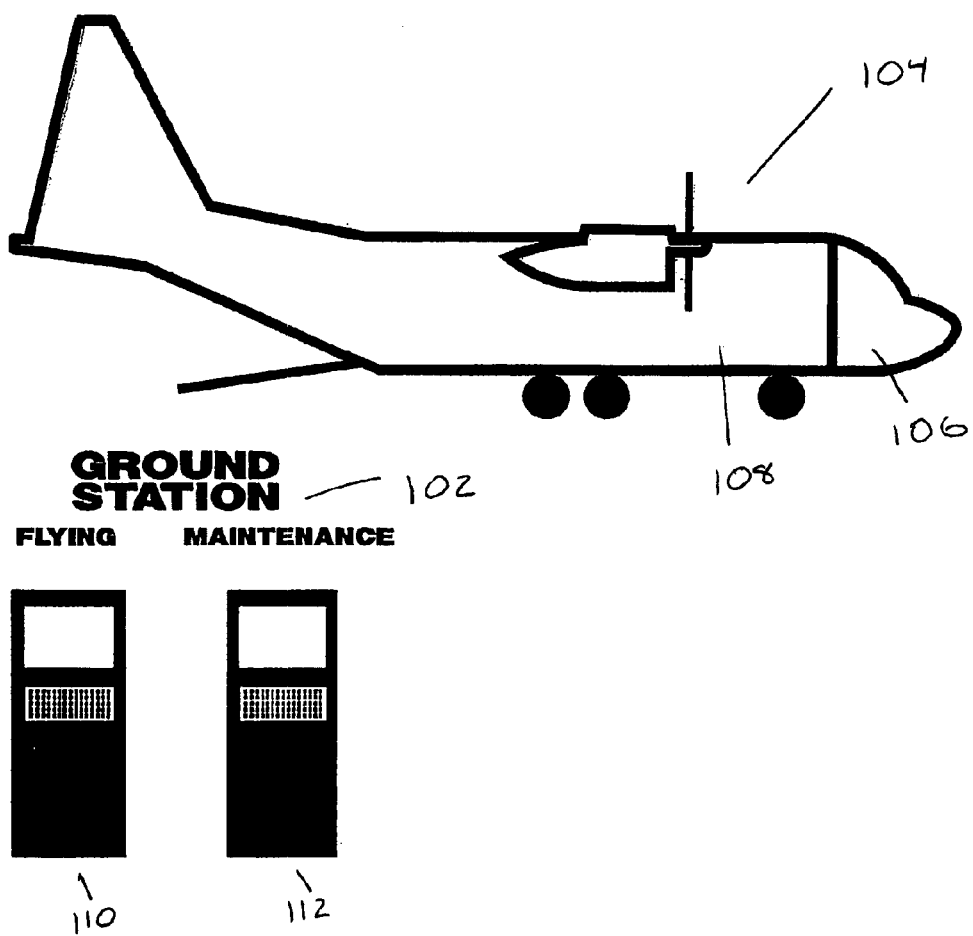
FIG. 1 is a diagram of the UAV system of the present invention.
Figure 2:
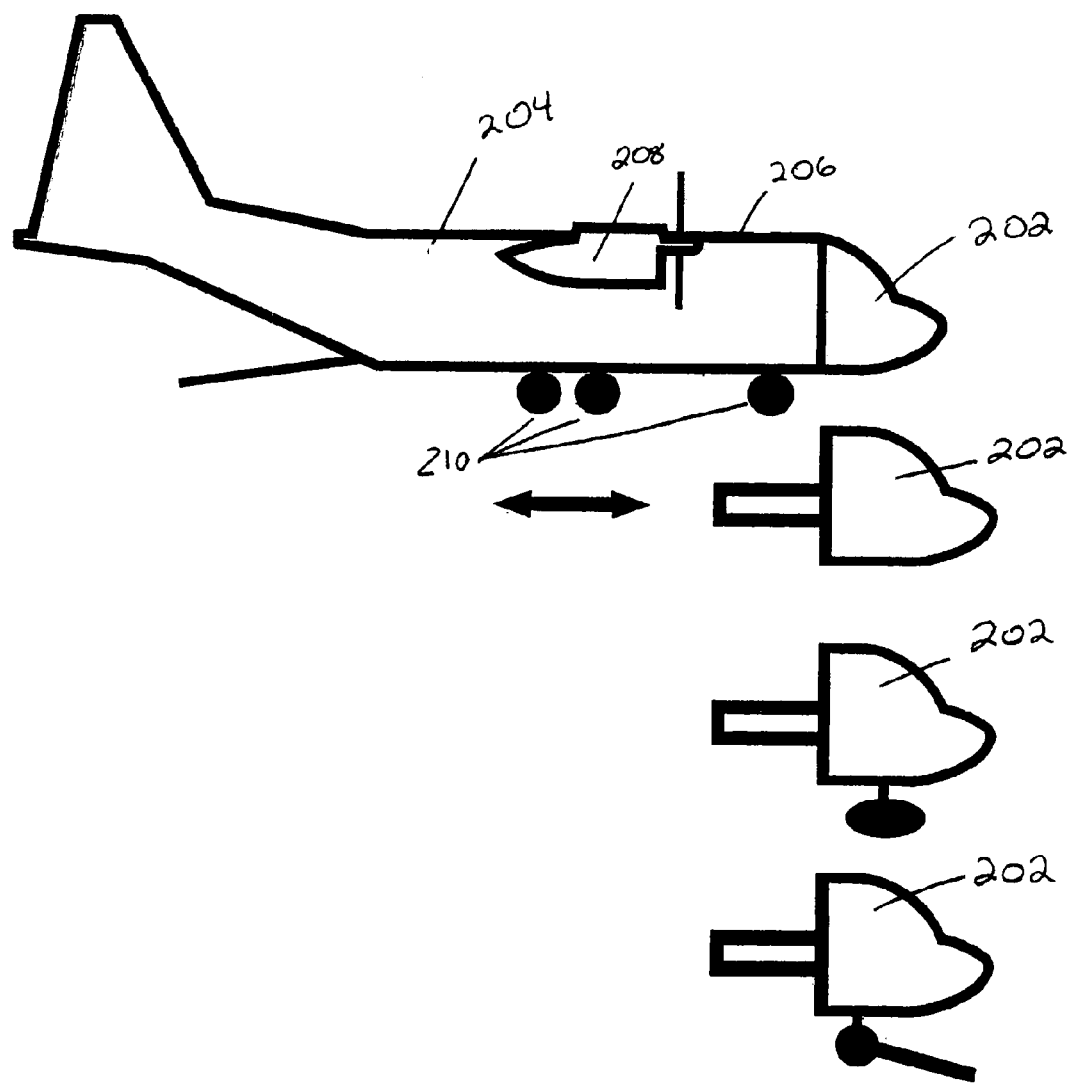
FIG. 2 is a side view of the UAV of the present invention.
Figure 3:
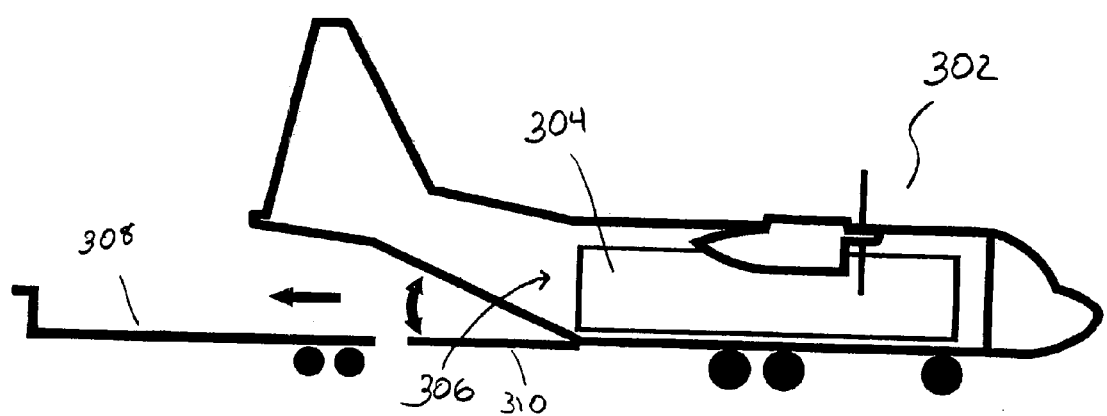
FIG. 3 is a side view of the air vehicle and gondola of the present invention.

Referring in more detail to the drawings, as shown in FIGS. 1–3, a preferred embodiment of the present invention is described. It is to be expressly understood that this exemplary embodiment is provided for descriptive purposes only and is not meant to unduly limit the scope of the present inventive concept. Other embodiments and variations of the carriers of the present invention are considered within the present inventive concept as set forth of the claims herein. For explanatory purposes only, the unmanned aerial vehicle of the preferred embodiments is discussed primarily for use as a cargo and freight transportation system. It is to be expressly understood that other types of equipment are contemplated for use with the present invention as well.

The unmanned aerial vehicle (UAV) system, as shown in FIG. 1, is a preferred embodiment of the present invention. UAV system 100 includes a ground station 102 and an UAV 104, wherein the UAV includes a modular gondola 106 and air vehicle 108. The ground station systems include flying 110 and maintenance 112 systems. The flying systems include data for navigation, flight control, communications, autopilot, engine control, flight planning, and vehicle monitoring. The maintenance systems include operations and facilities for aircraft loading and unloading as well as repair of the air vehicle and gondola of the present invention.

Turning now to FIG. 2, there is shown a depiction of the UAV of the present invention. The UAV includes a gondola 202 and air vehicle 204. The gondola 202 portion houses a central control computer embodying the avionic componentry, for performing the functions of navigation, flight control, communications, autopilot, engine control, flight planning, TCAS and ATC communications radio and vehicle monitoring. All avionic would include redundancy in order to eliminate catastrophic single and dual point failures. The gondola 202 would be attached to the air vehicle 204 by way of quick disconnect "umbilical" wiring which will connect all avionics to the air vehicle. In this way, the gondola portion can be used interchangeably between various air vehicles. It should be apparent to one skilled in the art that the central computer of the present invention would be open architecture and programmable.

In the preferred embodiment, navigation will be implemented using Global Positioning System (GPS). GPS is available worldwide on a full time basis, in addition it provides sufficient accuracy to handle take-offs, in flight navigation, approach and landings. In addition, enhancement such as radar and altimeter can be added to the GPS system to control dynamic in-flight conditions such as air space separation and landing.

Actual flight control can be handled by an autopilot system as is known in the art. For example, the autopilot system may include be the S-TEC® system sold by Meggitt Avionics/S-TEC, Mineral Wells, Tex. Such autopilot systems are easily integrated into GPS and vehicle controls.

Engine control is accomplished through the use of Full Authority Digital Engine Control (FADEC) Interface that is well known in the art. This interface provides complete integration of engine controls with the flight control central computer and other related avionics systems. The modular design of the UAV of the present invention facilitates the reduction of turn around time by providing the capability of attaching a gondola 202 to a waiting and loaded air vehicle 204. Therefore, the UAV of the present invention can be utilized in much the same way as ground based tractor-trailer or railroad transportation, wherein trailers or cargo cars are loaded independently of the power source, thereby increasing the efficient use of the cargo carrying and power component. Additionally, costs for operating the UAV of the present invention can be minimized by the modular design since a single gondola can be attached to a plurality of air vehicles. Alternately, the present invention can be implemented using a single structure air vehicle. In such an embodiment, the central computer can be an open architecture and programmable design, quick turn-around of the air vehicle can be accomplished by reprogramming the central computer after a flight leg, while the cargo is being unloaded and loaded. The single structure UAV is utilized in the same way as the modular design embodiment without the need for removing or attaching the gondola component. In this embodiment cargo can be maintained in a plurality of containers which are "staged" awaiting loading onto a predetermined UAV.

Turning again to FIG. 2, there is depicted a preferred embodiment of the air vehicle of the present invention. The air vehicle 204 includes the fuselage 206, the aerodynamic surfaces (not shown), control systems (not shown), the engines 208 and landing gear 210. The fuselage can be formed of a variety of structural designs to satisfy the parameters of the present invention, such as a monocoque design or other designs known in the art. In a particular embodiment, the fuselage structure can be partially provided by the cargo container. As will be hereinafter described, the air vehicle is adapted to receive a standard cargo container, which once loaded onboard is rigidly affixed to the air vehicle fuselage. In that way it becomes a stressed member of the fuselage structure, contributing to the torsional stiffness of the structure. Therefore, the fuselage is less expensive to construct since some of the structure is provided by the cargo vessel. In a preferred embodiment the air vehicle of the present invention should have the capability to carry a loaded standard shipping container weighing up to 30000 lbs. It is also desirable to have the ability to load and unload the such a container in a short period of time, directly from the cargo hold of the aircraft as a single load to a wheeled vehicle without separating the load into a plurality of packages. The loading and unloading of a single cargo vessel will facilitate the quick turnaround of the UAV. The turnaround time would include loading, unloading, fueling, flight planning. The UAV is designed to operate autonomously as a remotely piloted vehicle having no flight crew.

To meet the operational requirement of the UAV of the present invention, having a payload mass fraction of about 33%, the vehicle will have a gross weight on the order of approximately 90,000 pounds, having sufficient power to fly at modest speeds of 150 to 180 knots. Projected cruising altitude is expected to be approximately 10,000 to 15,000 feet. The UAV design approach is to make a mechanically simple vehicle to reduce the manufacturing costs. For example, the wing would be a constant cord design to minimize tooling and wing complexity. Additionally, advanced assembly techniques would be used such as friction stir welding in order to decrease costs of fabrication and assembly.

The wings of the air vehicle of the present invention would be of high lift design, which, while resulting in slower flight speeds would eliminate the need for complex high lift devices such as flap and slats. These devices materially complicate the design, cost, and maintenance of the aircraft. A similar approach to design will be applied to all aspects of the air vehicle, in order to minimize costs and complexity.

The air vehicle flight control system will include a conventional six degree of freedom (three axis) control mechanism. The aircraft will use ailerons for roll, elevator for pitch, and rudder for yaw with the control surfaces actuated either hydraulically or electronically. Additionally systems such as landing gear will be designed to accommodate use on airfields in undeveloped areas where uneven or unpaved landing sites are likely to be encountered. For example, the tires used will be a wide, low-pressure design to permit the air vehicle to land on unpaved landing areas, such as a grass field.

In the preferred embodiment, the aircraft of the present invention will be powered by propeller driven turbine engines, in order to meet the flight profile for altitude and range. For example, the engines may include turbine propeller engines sold under the trade designation AE2100® by Rolls Royce/Allison Corporation, Indianapolis, Ind.

Turning now to FIG. 3 there is shown the UAV 302 of the present invention. In the embodiment depicted, the air vehicle is adapted to carry cargo by receiving standard cargo containers 304 which are known in the art, into the cargo hold, 306. Typically, such containers are carried on wheeled trailers 308 as shown. The preferred embodiment of the UAV of the present invention will receive the container through a hinged ramped door 310 in the rear of the aircraft. In that way the cargo can be loaded or unloaded in a single action without long delays or extensive use of manual labor. The air vehicle of the present invention will also incorporate weight sensing devices throughout the cargo bay. Thus, when a cargo container is loaded into the air vehicle, the total weight, as well as the weight distribution of the load can be immediately measured. The central computer of the UAV according to the present invention can be programmed to calculate any changes to total weight and weight distribution as needed.

The use of a rear hinged door to access the cargo hold will also facilitate the removal of cargo by use of a parachute drop, wherein the container is slid out the rear of the plane during a low speed, low altitude pass over an appropriate drop site, where actual landing of the plane is not feasible. The ramped door can have several operating positions. For example, the ramp would be lowered to the ground so that containers on the ground could be slid up the ramp for loading. The door can also have an intermediate position to load containers directly into the body of the air vehicle from a truck. The air vehicle can also be equipped with a winch to assist in loading and unloading of containers. It should be understood that the ramp can be raised or lowered to accommodate the loading of a container from a variety of positions.

In an alternate embodiment, the UAV of the present invention can be adapted to utilize a hinged front opening, however the front loading method would obviously preclude the delivery of cargo by parachute drop it would have the advantage of requiring less structural reinforcement of the air vehicle.

In addition to the UAV, the system of the present invention includes a ground station for flight and maintenance control. The flight control portion includes data for navigation, flight control, communications, autopilot, engine control, flight planning, and vehicle monitoring that is downloaded to the central control computer of the gondola 202.

In a preferred embodiment, the UAV system of the present invention will include a central hub ground station and a plurality of remote locations. The central hub location will encompass the functions of control the fleet of UAV's including fleet scheduling, service and scheduled maintenance and flight planning. Flight planning will include the generation of flight plans as well as their transmission to remote locations for installation into UAV's awaiting flight plans for ensuing routes.

In a remote location, a ground crew will provide the functions of loading/unloading, fueling for the ensuing leg of the flight, flight plan downloading and installation into the gondola central computer and resolution of any exigent maintenance issues.

In operation, the UAV of the present invention in a preferred embodiment will receive a cargo load from a wheeled vehicle. The cargo load will be contained in a standard 40 foot shipping container as used in the freight industry. The container will be loaded onto the air vehicle preferably through a rear door ramp system and secured therein. Prior to, or during loading the air vehicle would be services as needed. Service may typically include fueling, structural inspection, inspection of aerodynamic and control devices and engine servicing.

A trained ground crew would conduct all of the loading and servicing procedures in order to prepare the air vehicle for connection to the gondola and subsequent flight. If the air vehicle is not already connected with a gondola, it can be held in a staging area until a gondola is available. Once available, the gondola will be attached to the air vehicle. The gondola electronic flight systems will be programmed with all flight plan information. Flight planning would be accomplished from a central headquarters, transmitted to the remote location, preferably by way of a wide area network, such as the internet or by satellite link. The flight plan data would then be transferred to the central computer of the gondola. Once the flight plan has been transferred to the central computer the program would be instantiated and the UAV launched to autonomously complete the flight plan.

While in flight the central computer would provide continuously monitoring of all vehicle functions. Furthermore, the flight computer can provide telemetry to transmit data concerning all monitored systems to a ground based central station.

The complete flight plan would also include approach and landing data, although in an alternate embodiment, approach and landing could be controlled by a ground based system at the arrival location. This system could be under the control of a "operator" utilizing a two way telemetry system or a computer based expert system for controlling approach and landing at a particular location. Once completing the flight plan, the UAV of the present invention is met by ground crew that unloads the air vehicle, transfers the container to wheeled ground transport, performs maintenance and prepares the UAV for subsequent flights. The ground crew can also transfer the gondola to a waiting air vehicle, download a new flight plan and program the gondola central computer for the next flight. Alternately, the central computer of the present invention can be remotely programmed without the intervention of the remote location ground crew. Such programming could occur by utilizing a direct RF link from the central headquarters utilizing satellite technology for example.

Various changes to the foregoing described and shown structures will now be evident to those skilled in the art. Accordingly, the particularly disclosed scope of the invention is set forth in the following claims.

What is claimed is:

1. A modular automated air transport system comprising:
   an unmanned autonomous aircraft having a selectively detachable control systems portion and a structural air frame portion wherein said control system portion is pivotally hinged to said structural air frame portion;
   wherein said structural air frame portion contains an interior cargo hold, aerodynamic members having control surfaces and at least one propulsion device attached to said structural air frame portion, wherein said structural air frame portion includes an opening for accessing said interior cargo hold and a ramp to access said opening; and
   wherein said control system portion includes a control computer for autonomously controlling the flight of said air transport system from one known location to a second known location.

2. The modular automated air transport system of claim 1 wherein said control computer is detachably connected to said control surfaces and said propulsions system.

3. The modular automated air transport system of claim 1 wherein said cargo hold is adapted to receive a standard shipping container.

4. An automated air transport system comprising:
   an unmanned autonomous aircraft having an interior cargo hold with a floor, aerodynamic members having control surfaces and at least one propulsion device attached to said aircraft;
   wherein said aircraft includes a control computer for autonomously controlling the flight of said air transport system from one known location to a second known location and wherein said aircraft includes an opening for accessing said interior cargo hold; and
   wherein a ramp is used to access said opening together with a platform attached to said floor of said cargo hold, having means for automatically balancing and positioning a load within said cargo hold.

5. The modular automated air transport system of claim 4 wherein said control computer is remotely programmable.

6. The automated air transport system of claim 4 wherein said cargo hold is adapted to receive a standard shipping container.

* * * * *